March 23, 1971  TORAHIKO HAYASHI  3,572,259
APPARATUS FOR MOLDING ELASTIC DOUGH MATERIALS
FROM BAR SHAPES INTO SPHERICAL SHAPES
Filed July 8, 1969  4 Sheets-Sheet 1

INVENTOR.
TORAHIKO HAYASHI
BY Kenwood Ross &
Chester E. Flavin
ATTORNEYS.

United States Patent Office 3,572,259
Patented Mar. 23, 1971

3,572,259
APPARATUS FOR MOLDING ELASTIC DOUGH MATERIALS FROM BAR SHAPES INTO SPHERICAL SHAPES
Torahiko Hayashi, 23 Nozawa-cho, Utsunomiya-shi, Japan
Continuation-in-part of application Ser. No. 719,465, Apr. 8, 1968. This application July 8, 1969, Ser. No. 839,908
Int. Cl. A21c 11/20
U.S. Cl. 107—68
9 Claims

ABSTRACT OF THE DISCLOSURE

Apparatus for molding an elastic, malleable material such as bread dough, from a single or double layered bar into a plurality of single or double layered balls by a means for stabilizing the bar as it is fed vertically downwardly between the peripheral edges of a pair of horizontally disposed cutters.

CROSS REFERENCE TO RELATED APPLICATION

A continuation-in-part of application Ser. No. 719,465, filed Apr. 8, 1968, now abandoned.

BACKGROUND OF THE INVENTION

(1) Field of the invention

The invention relates to apparatus for enveloping a material, such as fruit jam, bean jam, cream, minced meat, chopped vegetables or other material possessing similar properties, with a bread dough or other elastic and malleable material possessing properties similar to those of bread dough.

(2) Description of the prior art

Mechanical installations for the performance of such functions have been heretofore available, but the operation of such has been to divide the manufacturing operation into several separate processes, each being performed by a specialized machine, so that such installations not only have taken up considerable space but also have necessitated the expenditure of considerable labor and time and money in their operation.

In U.S. Pat. No. 3,351,026, I taught the broad idea of an apparatus in which a core material and a crust material are first molded into a two-layered bar shape and are then molded by a pair of cutters and a receiving dish into a two-layered ball shape. This apparatus, however, has definite limitations with respect to the range of materials which it is capable of processing and the precision of such processing, and with respect to the very process itself, it being exceedingly difficult to use therewith an elastic or malleable material, such as bread dough, as the crust material.

SUMMARY OF THE INVENTION

In this invention, all of the components are linked together into a unitary whole, so that the product thereof can be manufactured easily, economically, and quickly, on a large scale, and in a far narrower work space than has been required heretofore.

The apparatus is capable of smoothly forming two-layered ball-shaped articles consisting of a core material encapsulated by a strongly elastic, malleable crust material of a uniform thickness.

DESCRIPTION OF THE PREFERRED EMBODIMENT

Figure 1:
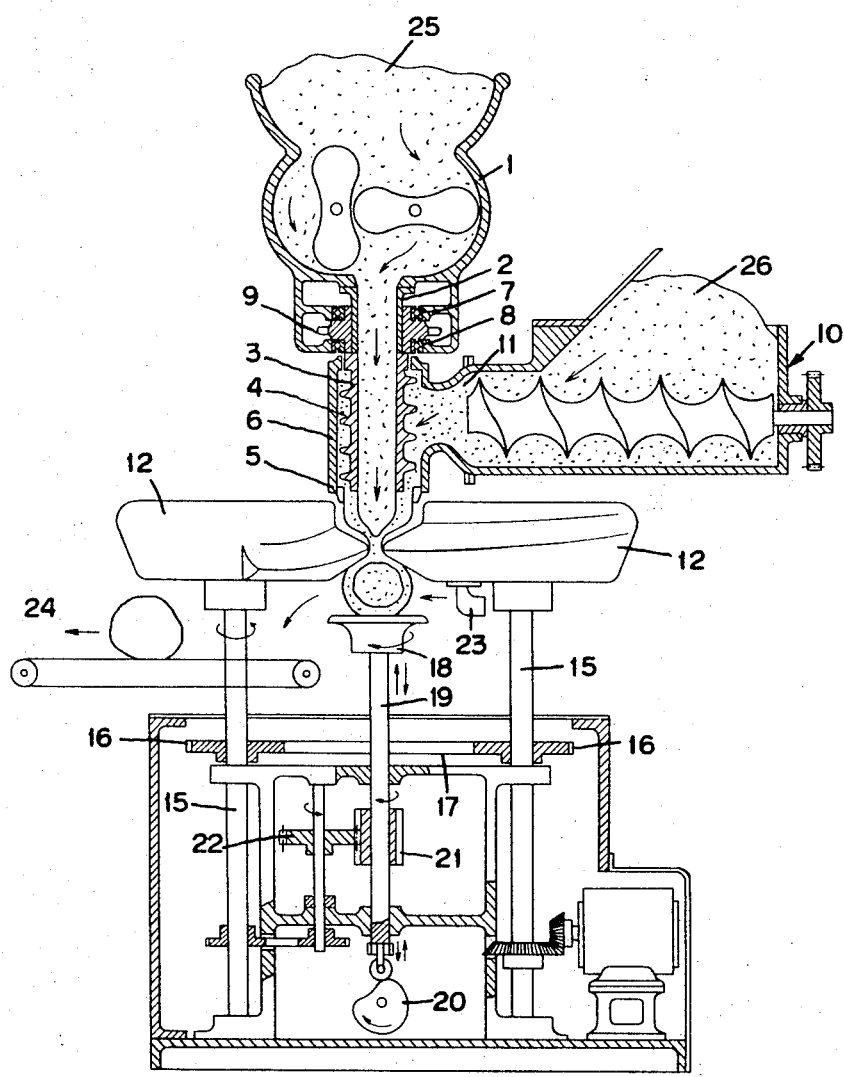
FIG. 1 is a partial view, in vertical section, illustrating the equipment of the invention.

What is comprehended here is an apparatus for forming two-layered balls from a two-layered bar consisting of an elastic, malleable crust material enveloping a core material. The apparatus is provided with a pair of identical cutters, located opposite to each other in the same horizontal plane, and attached to a pair of vertical shafts, and rotated in the same direction in such a way that their cutting edges are always in alignment with each other at their corresponding points of nearest accession. The apparatus is also provided with means for rotating a two-layered bar while feeding it between the cutters.

The cutters are so formed as to meet four requirements: (1) the edge of a cutter blade is in the form of a spiral laid out on a surface of revolution around a vertical axis, whose radius gradually increases from its top to its middle and does not decrease from its middle to its bottom; (2) the edge of a cutter blade has a certain degree of bluntness throughout its length; (3) the underside of a cutter blade is a flat surface whose inclination gradually changes from more vertical at the top or beginning of the cutter blade to more horizontal at its bottom or ending; and (4) the upper side of a cutter blade is so shaped that, first, the material being supplied comes in contact with only the edge of the blade or the portion of the upper side near to that edge, and, second, there is always a gap between the rest of the upper side and the material.

By the use of a pair of cutters having these four features, a two-layered bar whose crust is composed of an elastic, malleable material can be smoothly cut and formed into two-layered balls.

The core material passes through a hollow shaft, around the outside of which a screw, or other suitable device for conveying the crust material, is circumposed. As the core material emerges from the hollow shaft, it is enveloped by the crust material.

A rotary ring is positioned adjacent the end of the hollow shaft so that an annular aperture is formed between ring and shaft. As the crust material passes through this aperture, it is formed into a tubular shape having a uniform wall thickness. Since the ring is located close to the cutters, lateral movement of the two-layered bar during the cutting and balling operations is precluded.

Two-layered balls can thus be smoothly molded without any defects caused by any buckling or bursting of the two-layered bar.

Further, the hollow shaft, the device for conveying the crust material, and the ring, are integrally formed for rotation as a unit. The same rotation is thus imparted to the two-layered bar as it is fed into the cutters. The result is that, in comparison with my own prior patent, this invention is capable of molding a wider range of materials and with a greater degree of precision.

It will become apparent that the cutters hereof have features entirely different from the cutters in my prior patent.

A core material supply device 1 accommodates a core material 25, such as bean jam, cream, fruit jam, or the like, and has an outlet which is connected to a discharge pipe 2 insertable into a rotary hollow shaft 3. The interior of shaft 3 defines a passage for the core material. A helical screw 4 is attached to the exterior of shaft 3. A rotary ring 5 is attached to the bottom threads of screw 4.

Shaft 3, screw 4 and ring 5 constitute a rotatable feeder device which is housed within a cylinder 6, and is supported by bearings 7 and 8. The feeder device is rotated within cylinder 6 by means of a sprocket wheel 9.

A device 10 for supplying crust material 26 into cylinder 6 attaches to an inlet 11 on the side of the cylinder whereby the cylinder is supported by said supply device.

Figure 2:
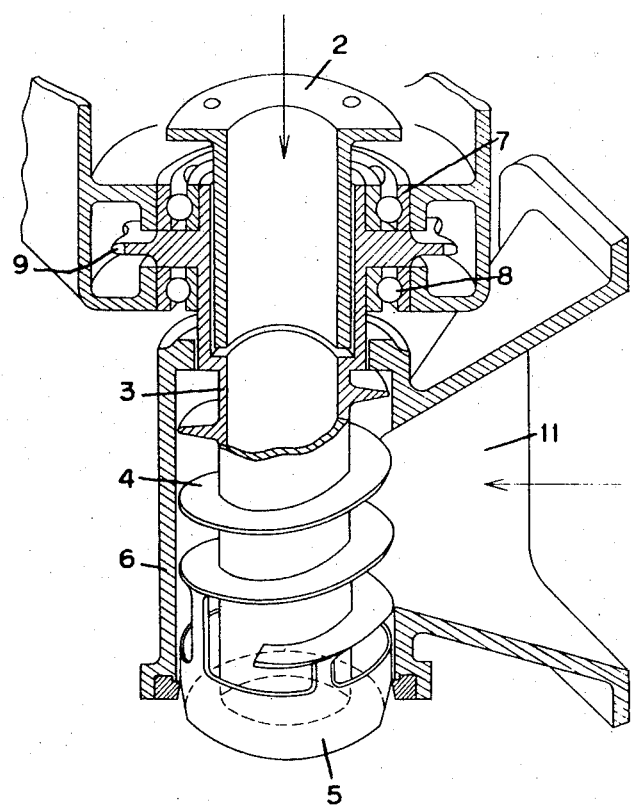
FIG. 2 is a fragmentary perspective view of a vertical section through the part of the aparatus in which the materials are formed into a two-layered bar shape.

As shown in FIG. 2, ring 5 is coaxial with hollow shaft 3, the outlet for the core material, so that an annular aperture is formed. Ring 5 is secured to screw 4 by means of a plurality of posts arranged along the outer edge of the lowermost thread.

A rotational movement is imparted both to core material 25 and crust material 26 as each is conveyed through the feeder device.

Cutters 12 meet specifications as set forth in the next four paragraphs.

Figure 6:
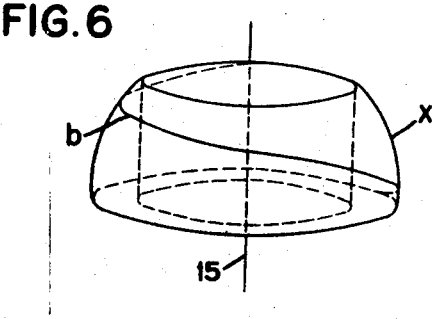
FIG. 6 is a diagrammatic view, supplementary to FIG. 5.

The cutting edge 13 of a cutter 12, as shown in FIG. 6, is in the form of a spiral $b$ laid out on a surface of revolution $x$ around a vertical axis, the radius of which surface $x$ preferably increases at a decreasing rate from its top to its bottom. It may be sufficient, however, if that radius increases gradually (not necessarily at a decreasing rate) from the top of surface $x$ to its bottom, or if the rate of increase is zero near the bottom of that surface. Such a cutter blade is referred to as a "spiral blade."

Cutting edge 13 has a certain degree of bluntness throughout its length.

Figure 5:
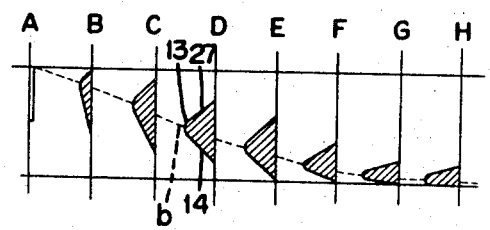
FIG. 5 is a diagrammatic view to illustrate how the cross-sectional shape of the cutting edge varies around the circumference of each cutter.

The underside 14 of the spiral blade forms a straight line in any cross-section through the axis of its respective cutter 12. As shown in FIG. 5, the inclination of that straight line changes gradually from more vertical at the top of the blade to more horizontal at its bottom.

The upper side 27 of the spiral blade is so structured that the material being supplied comes in contact with only the portion of the upper side near to cutting edge 13 and further that there is always a gap between the rest of the upper side and the material being supplied.

Cutting edge 13 is of a shape significantly different from that of a blade in the usual sense, since it is not sharp and in fact must have a certain degree of bluntness. Cutting edge 13 is either rounded, flat or obtuse-angled; it is by no means acute-angled or sharp. If cutting edge 13 were made too sharp, it would cut like a wedge through the crust material and lay open the core material, wherefore the objectives of this invention would not be realized.

The configuration of the spiral blade hereof is based upon the following considerations.

Cutter 12, both in my prior patent and in the present invention, does not aim at cutting the material in a manner whereby the edge of the blade penetrates into the material while the opposite sides of the blade separate the material. Rather it aims at avoiding such a wedge-like penetration as much as possible. The function of cutter 12 in actuality is to pull the material apart by causing the spiral blade to descend at a slightly faster speed than the speed of descent of the material being supplied. This pulling operation is necessary in order to prevent the core material from being cut into and exposed by the wedging action of the cutting edge.

In the earlier patent, the aim of the operation was to cut the material simply by pulling it in a longitudinal direction so that there was a necessity for some means for insuring that the material separated at a precise and intended place. It was therefore necessary to make the cutting edge at the terminal end of the spiral blade, that is at the bottom of the cutter, much thinner than the rest of the cutting edge. Bu when such was used for an elastic material such as bread dough, a wedge-like penetration of the dough occurred before the material could be properly separated with the result that the dough, which had been stretched in the vicinity of the separation point during the cutting operation, would contract somewhat, due to its own elasticity, so that the separation point would open up immediately following the cutting operation, thereby exposing the core material.

Herein, a precisely determined rotation is imparted to the material by the rotary feeder device, and the material is guided to a predetermined position, free of any lateral movment. Meanwhile, the synchronized rotation of the cutters causes the point of nearest accession of the two spiral blades to move gradually downward in relation to the cutters. Since, as aforesaid, the radii of the cutters gradually increase from their tops to their bottoms, as illustrated diagrammatically in FIG. 6, the gap between the opposing cutting edges gradually decreases, while the tangential velocities of the opposing cutting edges gradually increase. Thus, when the material, to which a constant rotation is imparted during the molding process, comes in contact with the cutting edges, whose tangential velocities are gradually increasing as the gap between them decreases, then, to the extent that the cutting edges possess a certain bluntness, twisting is induced in the material at its narrowst point, i.e. the point where it is in contact with the cutting edges.

Moreover, the difference between the rotational velocity of the material and the gradually increasing tangential velocities of the cutters grows gradually greater as the point of nearest accession of the two spiral blades moves downward in relation to the cutters. At the same time, the material is constricted by the narrowing of the gap. Both factors contribute to a gradual increase in the twisting effect.

In other words, the more constricted the material, the more pronounced the twisting effect, and as the extreme limit of twisting is reached, the elasticity of the dough material around the constricted area becomes fatigued, and separation occurs.

Consequently, herein, it never happens that, following the cutting operation, the elasticity of the dough material around the separation point causes the ball to open up to expose the core material.

It is reiterated that in order to produce a twisting-cutting effect, it is necessary that the cutting edges possess a certain degree of bluntness throughout their lengths.

Even though the cutting edges possess a certain thickness, however, the materials always separate at exactly the same place because separation is effected as the result of twisting and not of pulling. There is no necessity for making the cutting edge at the bottom of the cutter any thinner than the rest of the cutting edge, as in my earlier patent.

The speed of the material supply, the number of revolutions per minute given to the material, and the pitch of the spiral blades must all be predetermined so that the cutting operation can be effectively carried out with no wedge-like penetration of the cutting edges into the material.

The underside 14 of the spiral blade forms a straight line in any cross section through the axis of its respective cutter 12. As shown in FIG. 5, beginning with position A and moving to position H, the orientation of the straight line changes gradually from more vertical to more horizontal. In view of the fact that flat underside 14 of the spiral blade is more vertical at starting position A, a two-layered ball-shaped article with an outer crust material of uniform thickness can be effectively molded.

Upper side 27 of the spiral blade must be so shaped that contact between it and the material being cut is limited to the area of the upper side near the cutting edge. Such contact interferes with the twisting action whereby separation is effected. This invention minimizes such contact.

More specifically, the upper side of the spiral blade must not be made concave to accommodate the leading end of the descending material, as in my prior patent. Instead, upper side 27 must be kept apart from the material so that the contact area of the upper side with the leading end of the descending material may be as small as possible.

In FIG. 5, references A, B, C, D, E, F, G and H are to eight vertical cross-sections of a spiral blade taken through the axis of its respective cutter 12 and arranged in order of the height of cutting edge 13. A dotted line $b$ connecting the apexes of these cross-sections corresponds to spiral $b$ drawn on surface of revolution $x$, as shown in FIG. 6. The pitch of spiral $b$ is not necessarily constant. The number of turns of spiral $b$ is preferably less than one and a half, but is not strictly limited thereto.

It was essential in my earlier patent that the cutting edge be in the form of a spiral laid out on a surface of revolution whose radius increased at a decreasing rate from its top to its bottom, but there is no such requirement with respect to cutting edge 13 in this invention.

In the prior patent, the separation of the material was effected by a simple longitudinal pulling action. In order to define the precise point at which the material would separate, it was necessary to make the cutting edge much thinner at the bottom of the cutter than elsewhere. As a result, that part of the cutting edge had a tendency to penetrate the crust material, like a wedge, so as to expose the core material. In order to prevent such penetration and exposure, the shape of the spiral along which the cutting edge was arranged had to be carefully controlled.

Herein, the separation of the material is effected by a twisting action, so that the point at which the material separates can be defined more precisely than was possible in the case of separation by pulling. Consequently, cutting edge 13 can now be provided throughout its length with an apex so blunt that it will not wedge into the material. There is no longer any necessity, therefore, for any strict control over the shape of the spiral blade.

Herein, any of the following shapes will suffice:

(A) A spiral laid out on a surface of revolution whose radius increases gradually toward its bottom; or (B) A spiral laid out on a surface of revolution whose radius increases only down to a certain point, beneath which it is constant; or (C) A spiral laid out on a surface of revolution whose radius increases down to a certain point, beneath which the rate of increase of said radius is either decreasing or zero down to a second certain point, beneath which said radius increases.

In this embodiment, a pair of cutters 12, identical in shape, are located opposite to each other in the same horizontal plane on a pair of vertical shafts 15. Since the blades have a spiral shape, they must be positioned with great precision so as to insure that, as the cutters rotate, the cutting edges will always be in alignment with each other, both at their corresponding points of nearest accession and at all other corresponding points around their circumferences.

To cause the cutters to rotate in the same direction and at the same speed, shafts 15 are provided with identical sprockets 16 and a chain 17. The clearance between the cutters affords a passage for the core material and the crust material. These materials must be rotated in a direction opposite to that of the cutters as they are fed between them. Consequently, the axis of the rotary feeder device corresponds to the vertical line passing through the midpoint between cutters 12, and the direction of rotation of the rotary feed device is opposite to that of the cutters.

Furthermore, the interspaces between rotary ring 5 and the upper peripheries of cutters 12 are made as small as possible, leaving only enough room so that the rotary ring and the spiral blades do not interfere with each other when they rotate.

Experimentation has taught that the maximum allowable interspace is 10 millimeters when a molded ball weighing less than 80 grams is being produced. When the interspace is more than 10 millimeters, lateral flutter develops, processing accuracy is greatly lowered, and the desired twisting effect can not be obtained, causing such defects as exposure of the core material.

Beneath cutters 12, a receiving dish 18 is so located that the vertical line through the midpoint between the cutters passes through its center. The dish is attached to the top of a shaft 19 which rotates while moving up and down in a prescribed manner. Both dish 18 and shaft 19 are centered upon, rotate about, and move along, the same vertical axis. This rotation is in the direction opposite to that of cutters 12. In order that the upper hemisphere of the ball being formed may be smoothed by rubbing against undersides 14 of the spiral blades of the cutters, it is desirable that the angular speed of the dish satisfy the formula:

$$a > A \cdot \frac{R}{K-R}$$

where $a$ is the angular speed of the dish, A is the angular speed of the cutters, R is the minimum radius of a cutter, and K is the distance between the axis of the rotary feeder device and an axis of a cutter.

Dish 18 moves up and down at the rate of one cycle per one rotation of a cutter 12. The descending and ascending speeds of the dish are not necessarily equal to each other and should be selected with due regard to the descending speed of cutting edges 13 and to the stage of progress of the cutting operation. The up-and-down movement of dish 18 is effected by means of a cam 20 located at the lower end of shaft 19. The timing and speed of the up-and-down movement of the dish may be regulated by the peripheral configuration of the cam. Shaft 19 is rotated by means of gears 21 and 22.

A pusher 23 for transferring the completed articles onto a conveyer belt 24 is affixed to one of the cutters 12 and positioned adjacent the terminal end of the spiral blade.

The operation will now be explained.

Core material 25 is forced from core material supply device 1 through discharge pipe 2 into hollow shaft 3, which is rotated by sprocket wheel 9. Shaft 3 imparts a rotation to core material 25 while supplying it in a steady stream in the direction of cutters 12.

Meanwhile, crust material 26, forced from supply device 10 through inlet 11 into cylinder 6, is pushed downward in a tubular shape by helical screw 4, and envelops core material 25 in the vicinity of the nozzle or outlet of shaft 3, thus forming a two-layered bar shape. As it comes into the vicinity of the nozzle of shaft 3, crust material 26 passes through the annular aperture defined by the nozzle and ring 5. As it passes through this aperture, the crust material is given a uniform thickness as well as a rotation exactly equal to that of the core material, and thus the crust and core materials are forwarded to the cutters as one body. Understandably, the spirit of the invention comprehends the forming of balls when core material is not fed through hollow shaft 3 and only crust material 26 is fed through cylinder 6.

Figure 3:
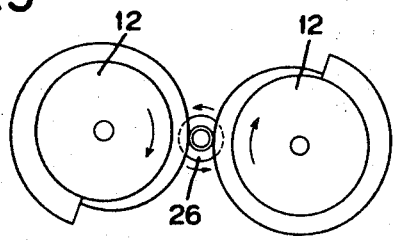
FIGS. 3 and 4 are each views, in top plan, of a pair of cutters, to illustrate their functions and the juxtaposition of their cutting edges.
Figure 4:
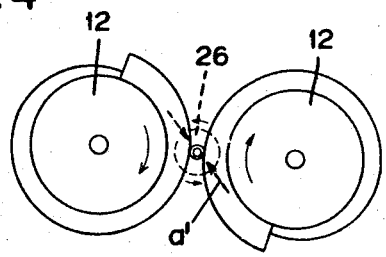

When the cutters are caused to rotate and when materials 25 and 26, which have been molded into a two-layered bar by the action of the rotary feeder device, are supplied to the cutters at a speed slightly slower than the speed of descent of the spiral blades of the cutters, then the two-layered bar can be effectively cut and formed into two-layered balls without any exposure of the core material. See FIGS. 3 and 4.

Figure 7:
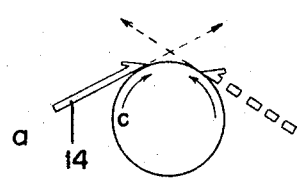
FIGS. 7 to 12 are views illustrating the functions of the cutters.
Figure 8:
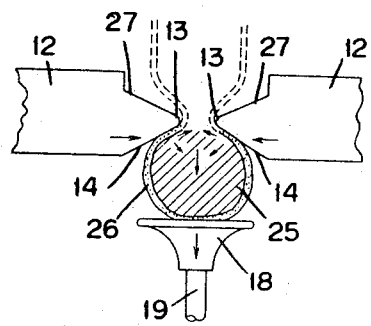

From the top of a spiral blade to the terminal end thereof, the inclination of underside 14 changes gradually from more vertical to more horizontal, and the angle of incidence of underside 14 becomes larger. Simultaneously, as seen in FIG. 8, since underside 14 is in contact with crust material 26 and since the distance between cutting edge 13 of the spiral blade and the axis of its cutter 12 gradually increases, the forces which are induced on the surface of the bar-shaped material by the friction between the underside of the blade and said surface may be shown by arrow a in FIG. 4 when seen from above. In other words, such a force is continuously exerted on the surface of crust material 26 around the point at which separation is to occur. An arrow c in FIG. 7 shows the direction of movement of crust material 26 resulting from said force.

This action of said force is reinforced by means of receiving dish 18, which steadies the material during the cutting operation and, in particular, controls the pressure which is exerted on crust material 26 by underside 14 of the spiral blade. This control is accomplished by continuously altering the height of dish 18 in synchronization with the changes which occur in the height and inclination of underside 14 as its cutter 12 rotates. This continuous alteration of the height of dish 18 is accomplished by the up-and-down motion imparted to shaft 19 by cam 20.

As the inclination of underside 14 of the blade changes gradually from more vertical to more horizontal and the material moves downward together with dish 18, the descending material is gradually constricted and rounded inward. This action of underside 14 molds crust material 26 into an upper hemispherical shape which completely envelops core material 25.

Figure 9:
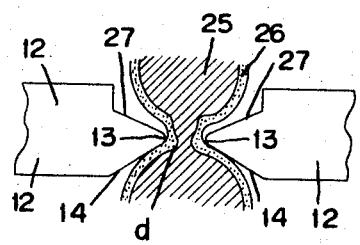
Figure 10:
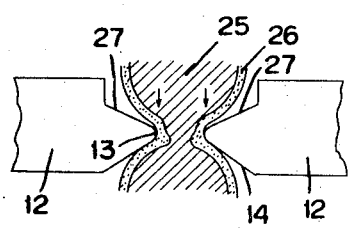

The molding of the lower hemisphere of the two-layered ball, without exposure of core material 25, takes place as follows. Because cutting edges 13 have a certain degree of bluntness, and because of the relationship between the rotational velocity of the material being cut and the tangential velocities of cutting edges 13, the material in the vincity of the separation point is subjected to considerable twisting before separation actually occurs, so that core material 25 is squeezed and expelled from the vicinity. Moreover, the force exerted on the surface of crust material 26 by underside 14 of the spiral blade during the molding of an upper hemisphere, as discussed above, causes a gathering of crust material 26 toward the separation point. As shown by reference letter d in FIG. 9, this results in a surplus of crust material 26 in the part where twisting occurs, which surplus reinforces the above-mentioned expulsion effect. Thus, when separation occurs, core material 25 has been substantially expelled from the vicinity of the separation point and replaced by a surplus of crust material 26.

Figure 11:
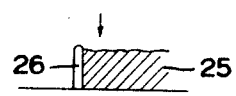
Figure 12:

The molding of the lower half of the two-layered ball is aided by the resiliency of crust material 26. If the pitch, and therefore, the angle of descent of spiral b is appropriately arranged, those areas which have been stretched and attenuated during the cutting process, as shown in FIG. 11, will have a tendency to pull back together again after separation occurs, as shown in FIG. 12. The result of this tendency is that, after separation, the lower half of the two-layered ball assumes a roughly hemispherical shape.

The effectiveness of the cutting process will be enhanced to the extent that contact between the material and upper side 27 of the spiral blade is minimized. This is one of the points in which the structural requirements of cutter 12 differ from the prior invention.

With reference to the relation between the rotary feeder device and cutters 12, since the rotary feeder device is provided with rotary ring 5, which is thin at its lower end and which can be positioned very close to cutters 12, the material goes from the rotary feeder device to cutters 12 without any chance for lateral flutter to develop, and the balling operation can be accomplished with great precision. Without the employment of such a rotary feeder device, lateral flutter would develop during the cutting operation. If a product such as rolls with jam filling were being manufactured, such flutter would not be a great problem, since the jam is a relatively firm material; but if the core material were cream, jam, roux for curried rice or the like, such flutter would lead to exposure of the core material and make it very difficult to conduct an adequate balling operation. Consequently, the employment of the rotary feeder device makes it possible to mold two-layered balls using any of a wide range of materials as the core material and an elastic, malleable material such as bread dough as the inner material.

Furthermore, since the rotary feeder device, in addition to feeding the material into the cutters without allowing lateral flutter to develop, at the same time imparts a rotation to the material, it makes possible the smooth molding of materials such as bread dough, which have high elasticity and great tensile strength. To be more precise, the material is caused to rotate, cutting edges 13 are applied, and the resulting twisting effect is concentrated in that part of the material which has been slightly narrowed by contact with the cutting edges. Since the bread dough or other crust material has great tensile strength, core material 25 is expelled from the part where the twisting occurs, and eventually, separation occurs at the place where the twisting is most intense.

Various modifications and improvements can be made herein without departing from the scope of the invention as disclosed in the appended claims. For instance, it is permissible to arrange rotary ring 5 so that it is not concentric with rotary hollow shaft 3. In this case, a two-layered ball shape whose crust is of non-uniform thickness would be formed. It is also not essential that rotary-ring 5 be attached to the blade of screw 4; ring 5 may be secured to the outside of the nozzle end of rotary shaft 3, if necessary. Further, screw 4 itself may be replaced by another appropriate device for feeding the material.

I claim:

1. In an apparatus for forming uniformly-sized balls from a bar of an elastic malleable dough material and including a rotative bar forming means for feeding the bar vertically downwardly toward and in the gap between a pair of horizontally-disposed circular cutters located for coaction with each other and being rotatively mounted each on a vertical axis with the peripheral working sides of the cutters being in continuous alignment with each other at their corresponding points of nearest accession and a cooperant rotative receiving dish disposed beneath the cutters, the improvement comprising: a rotative annular ring fixed to and below the bar forming means for disposition vertically above the gap adjacent the top planar surfaces of the cutters for stabilizing the bar upon feeding to the cutters.

2. In the apparatus of claim 1, with the blade on the side between the top and bottom planar surfaces of each cutter being arranged in the form of a spiral laid out on a surface of revolution around the vertical axis, and with the outboard edge of the blade having a degree of bluntness throughout its length and defining a radius gradually increasing from the top planar surface to the midportion of the cutter and with the underside of the blade being a flat surface whose inclination gradually changes from vertical at its top to horizontal at its end, and with the upper side of the blade being recessed inwardly from the outboard edge for accommodating minimum contact of the bar at the outboard edge with a gap between the bar and the greater portion of the upper side of the blade.

3. In the apparatus of claim 1, with the peripheral speeds of the cutters increasing as the gap between the cutters decreases with a resultant inducement of a twisting of the bar.

4. In the apparatus of claim 1, with the difference between the tangential velocity of the material and tangential velocities of the edges of the cutters growing greater as the blades descend vertically.

5. In an apparatus for forming uniformly-sized balls from a bar on an elastic malleable dough material and including a bar forming means for feeding the bar of material vertically downwardly toward a pair of circular cutters disposed opposite each other in the same horizontal plane and each being rotatively mounted on a vertical axis with the spirally-arranged peripheral working sides of the cutters of the pair being in continual alignment with each other at their corresponding points of nearest accession and a rotative backing dish disposed beneath the pair of cutters: the improvement comprising: the bar forming means being in the form of a rotative hollow shaft for accommodating therethrough an inner core material and having a helical screw circumposed around the outer wall of the hollow shaft for conveying the outer dough material in enveloping manner around the inner core.

6. In the apparatus of claim 5, with the blade on the side between the top and bottom planar surfaces of each cutter being arranged in the form of a spiral laid out on a surface of revolution around the vertical axis, and with the outboard edge of the blade having a degree of bluntness throughout its length and defining a radius gradually increasing from the top planar surface to the midportion of the cutter and with the underside of the blade being a flat surface whose inclination gradually changes from vertical at its top to horizontal at its end and with the upper side of the blade being recessed inwardly from the outboard edge for accommodating minimum contact of the bar at the outboard edge with a gap between the bar and the greater portion of the upper side of the blade.

7. In the apparatus of claim 5, with the peripheral speeds of the cutters increasing as the gap between the cutters decreases with a resultant inducement of a twisting of the bar.

8. In the apparatus of claim 5, with the difference between the tangential velocity of the material and tangential velocities of the edges of the cutters grows greater as the blades descend vertically.

9. The process of molding and cutting a bar of dough into a plurality of spheres comprising the steps: forming the bar, feeding the bar vertically downwardly, and guiding the bar through a rotating ring toward a pair of horizontal cutters.

References Cited

UNITED STATES PATENTS 3,351,026   11/1967   Hayashi _____ 107—68

LOUIS K. RIMRODT, Primary Examiner